United States Patent [19]

West

[11] Patent Number: 4,535,915

[45] Date of Patent: Aug. 20, 1985

[54] DELIVERY AND METERING DEVICE FOR GRANULATED AND POWDERED MATERIALS

[75] Inventor: Joe E. West, Coppell, Tex.

[73] Assignee: The Western Company of North America, Forth Worth, Tex.

[21] Appl. No.: 516,378

[22] Filed: Jul. 22, 1983

[51] Int. Cl.³ .............................................. G01F 11/20
[52] U.S. Cl. ....................................... 222/56; 222/63; 222/271; 222/318; 222/413; 198/671; 198/954; 73/861.73
[58] Field of Search .............................. 222/52, 55–57, 222/63, 142, 252, 265–268, 270–272, 318, 410, 413, 273, 274; 198/954, 524, 558, 548, 662, 671, 566, 525, 670; 366/177, 158, 297; 116/212, 273, 275, DIG. 34; 340/616, 617; 73/861.71, 861.73

[56] References Cited

U.S. PATENT DOCUMENTS

| 246,921 | 9/1881 | Tenant | 222/413 |
|---|---|---|---|
| 1,468,379 | 9/1923 | Easton | 222/413 |
| 2,115,464 | 4/1938 | Kirby | 222/413 X |
| 2,569,039 | 9/1951 | Berthelot | 222/413 X |
| 3,114,261 | 12/1963 | Dillon et al. | 73/861.71 |
| 3,238,773 | 3/1966 | Leigh, Jr. | 73/861.71 X |
| 3,645,505 | 2/1972 | McLeod, Jr. | 222/413 X |
| 3,973,758 | 8/1976 | Nyitray | 222/142 X |
| 4,067,238 | 1/1978 | Oetiker | 222/55 X |
| 4,067,478 | 1/1978 | Milek | 222/413 X |
| 4,234,074 | 11/1980 | Martin | 198/662 X |

FOREIGN PATENT DOCUMENTS 1588226 4/1981 United Kingdom ................ 222/413

Primary Examiner—Joseph J. Rolla
Assistant Examiner—Kevin P. Shaver
Attorney, Agent, or Firm—Richards, Harris, Medlock & Andrews

[57] ABSTRACT

A main screw feeder having a main screw housing set at an incline from the base of a bin. The main screw housing has two outlets, the advanced outlet and the recycle outlet. The advance outlet communicates with a metering screw housing in which twin screws of identical pitch are rotated in synchronous, intermeshed revolution. The delivery outlet for the metering screw housing communicates with the processing stages. The recycle outlet is positioned at an elevation higher than the advance outlet and discharges to the bin. A flow measuring device measures the return flow of granulated or powdered material expelled from the recycle outlet. The flow measuring device projects a prestressed cable into the recycle path of the return flow. A device for measuring any deflection of the cable and fluctuations in the tension thereon produce a signal which is a function of the return flow and which is used to control the speed of the main screw feeder.

15 Claims, 7 Drawing Figures

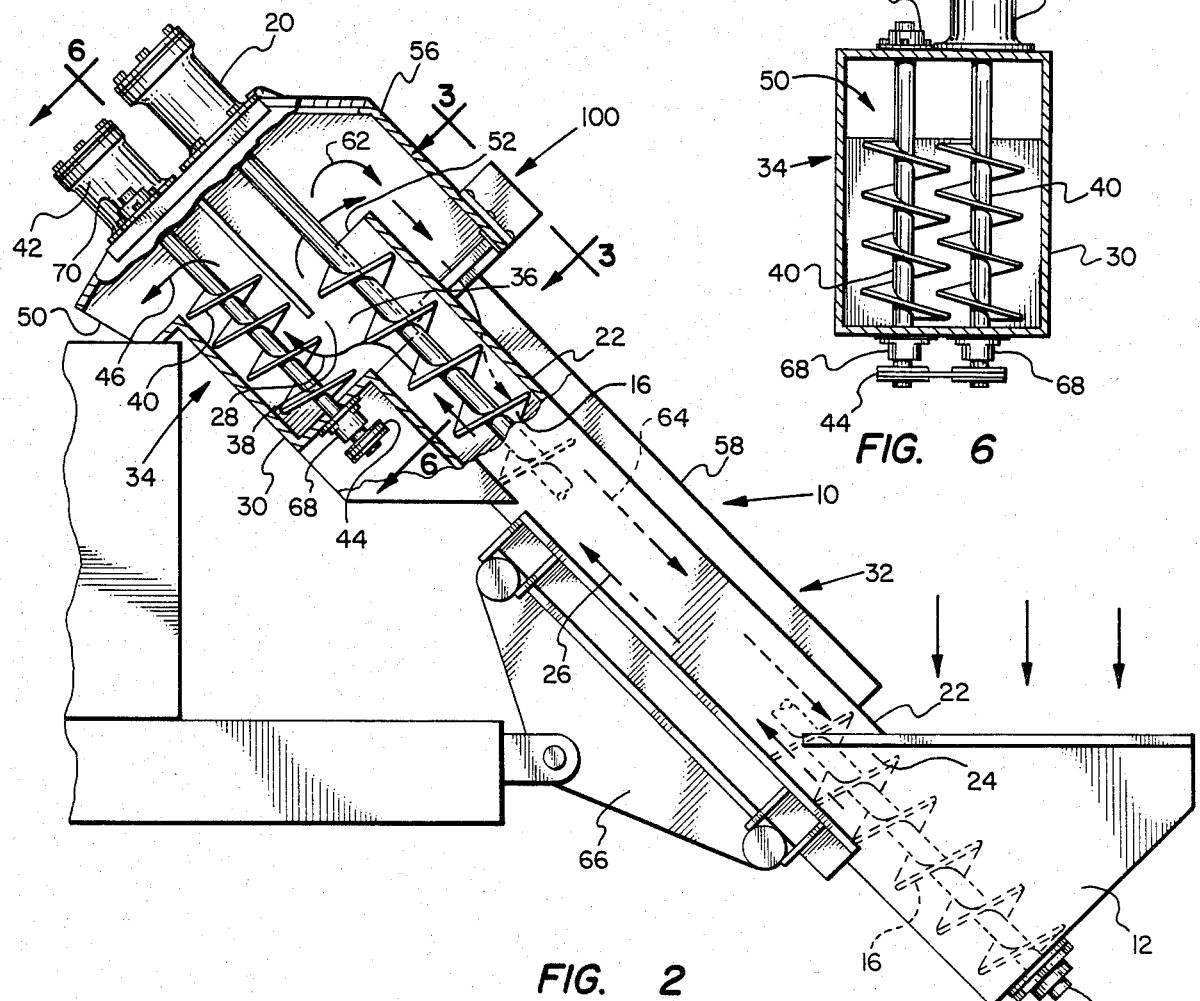
FIG. 2
FIG. 6
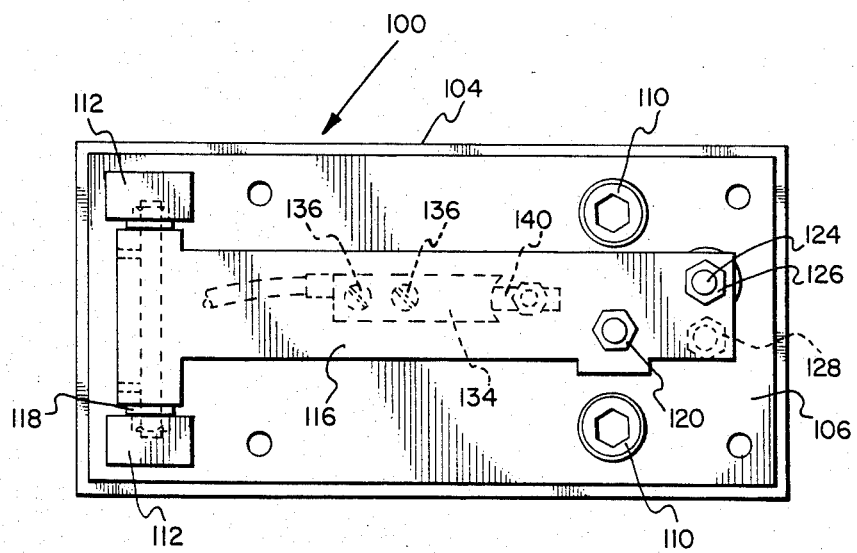
FIG. 3

DELIVERY AND METERING DEVICE FOR GRANULATED AND POWDERED MATERIALS

BACKGROUND

Many industrial applications require a dependable delivery of large quantities of sand or other granulated or powdered materials in carefully measured amounts. One of the most demanding applications is the preparation of fracturing fluid commonly used in oil well applications. Sand is the principal ingredient of fracturing fluid and oil well applications require a high volume of fracturing fluids to be continuously pumped into the bore hole at high pressure. Thus, vast, but metered, quantities of sand must be continually delivered to mixing facilities during fracturing applications. Further, the use of fracturing fluid demands careful control of tolerances in density and other parameters that are a function of the sand content.

Fracturing fluid applications use carefully graded sand of substantially uniform and repeatable characteristics. However, the sand component of fracturing fluid is very abrasive, even unto itself. Excess handling of the sand tends to reduce it into finer particles, thereby producing a sand of uncertain and uncontrolled characteristics which results in an inferior quality fracturing fluid.

It is the object of the present invention to provide a delivering and metering device that will carefully control the passage of a measured bulk quantity of granulated or powdered material; is capable of prolonged and continuous operation for high volumes of granulated or powdered material; and minimizes the handling of that material.

The present invention is illustrated throughout the specification as a device for delivering and metering sand for making fracturing fluid. However, this application is illustrative only and other applications will be fully taught and clearly apparent from this disclosure to persons having ordinary skill in the art.

SUMMARY OF THE INVENTION

The present invention relates to industrial applications requiring rapid and dependable delivery of large quantities of powders, profidents, granulated solids and other dry chemicals drawn from a collection facility. The collection facility is of sufficient storage capacity to allow a practical latitude in replenishing supplies. In the illustrated fracturing fluid application, front-end loaders carry sand by the bucketful to the collection facilities, here a bin.

A main screw feeder is inclined from its inlet at the base of the bin. Preferably, the main screw feeder has twin main screws set within main screw housings and means are provided to rotate each of the main screws.

The screw housing has two outlets, the advance outlet and the recycle outlet. The advance outlet leads to a means for metering the flow of the granulated or powdered material which is passed forward and delivered to a further processing stage. The advance outlet of the main screw housing communicates with a metering inlet of a metering screw housing. Twin screws of identical pitch and orientation are mounted in a parallel and intermeshing manner within the metering screw housing. Means are provided for turning the paired metering screws in synchronous revolution which advances granulated solids from the metering inlet of the metering screw housing to the delivery outlet thereof which is slightly higher in elevation than the uppermost edge of the metering inlet. The delivery outlet from the metering screw housing communicates with the processing stages which, in the illustrated preferred embodiment, is a mixing apparatus for making fracturing fluid.

Returning to the main screw housing, the recycle outlet therein is positioned at a higher elevation upon the inclined main screw housing than the advance outlet through which sand is directed into the means for metering the flow. The recycle outlet discharges to means for returning the dry chemical to the collection facilities, here the bin.

Another aspect of the present invention is a flow measuring device which measures the return flow of granulated or powdered material from the recycle outlet to the collection facility and generates a signal which is a function of the return flow and thereby controls the speed of the main screws.

The flow measuring device projects the probe end of a rigid frame into the recycle path of the flowing sand where the first end of a prestressed cable is attached. At the sensor end of the rigid frame, the second end of the prestressed cable is connected to means for measuring fluctuations in the tension thereon.

In the preferred embodiment, a lever arm is rigidly connected to the sensor end of the rigid frame and attached to the prestressed cable at the second end of the latter. A strain gauge housing is connected to the rigid frame and a sensor arm is connected to the strain gauge housing and extends into contact with the lever arm. The strain gauge within the strain gauge housing is connected to the sensor arm to receive the strain and displacement thereof as the input. The strain gauge generates an output signal that is filtered, amplified and processed by conventional means well known in the art to control the speed of the main screws.

In operation, sand is accumulated in the bin from which a steady stream is drawn by the main screw feeder and advanced up an incline to present a continuous supply of sand at the advance outlet of the main screw housing. Twin metering screws draw a carefully controlled amount of sand from the advance outlet of the main screw housing, through the concurrent metering inlet of the metering screw housing and advance the sand through the delivery outlet of the metering screw housing. Sand which is not drawn from the main screw housing at the advance outlet is carried further up the inclined main screw feeder to the recycle outlet of the main screw housing. This excess sand is expelled at the recycle outlet and falls through means for returning the sand to the bin. In the preferred embodiment, means for returning the sand to the bin is an open trough along the top of the main screw feeder.

The flow measuring device of the present invention is projected into the flow of sand expelled through the recycle outlet. The depth of sand hitting the measuring device is sensed to generate an output signal which controls the speed of the main screw feeder to present an excess, but a minimal excess of sand at the advance outlet from the main screw housing. Thus, controlling the volume of sand recycled limits detrimental effects to the quality of sand presented in the bin.

BRIEF DESCRIPTION OF THE DRAWINGS

FIG. 2 is a side-elevational view that has been partially broken-away to reveal internal members;

FIG. 3 is a cross-sectional view of the flow measuring device of the present invention taken along line 3—3 of FIG. 2;

FIG. 6 is a cross-sectional view of the metering means of the present invention as taken along line 6—6 of FIG. 2.

DETAILED DESCRIPTION OF THE DRAWINGS

Figures 1, 7:
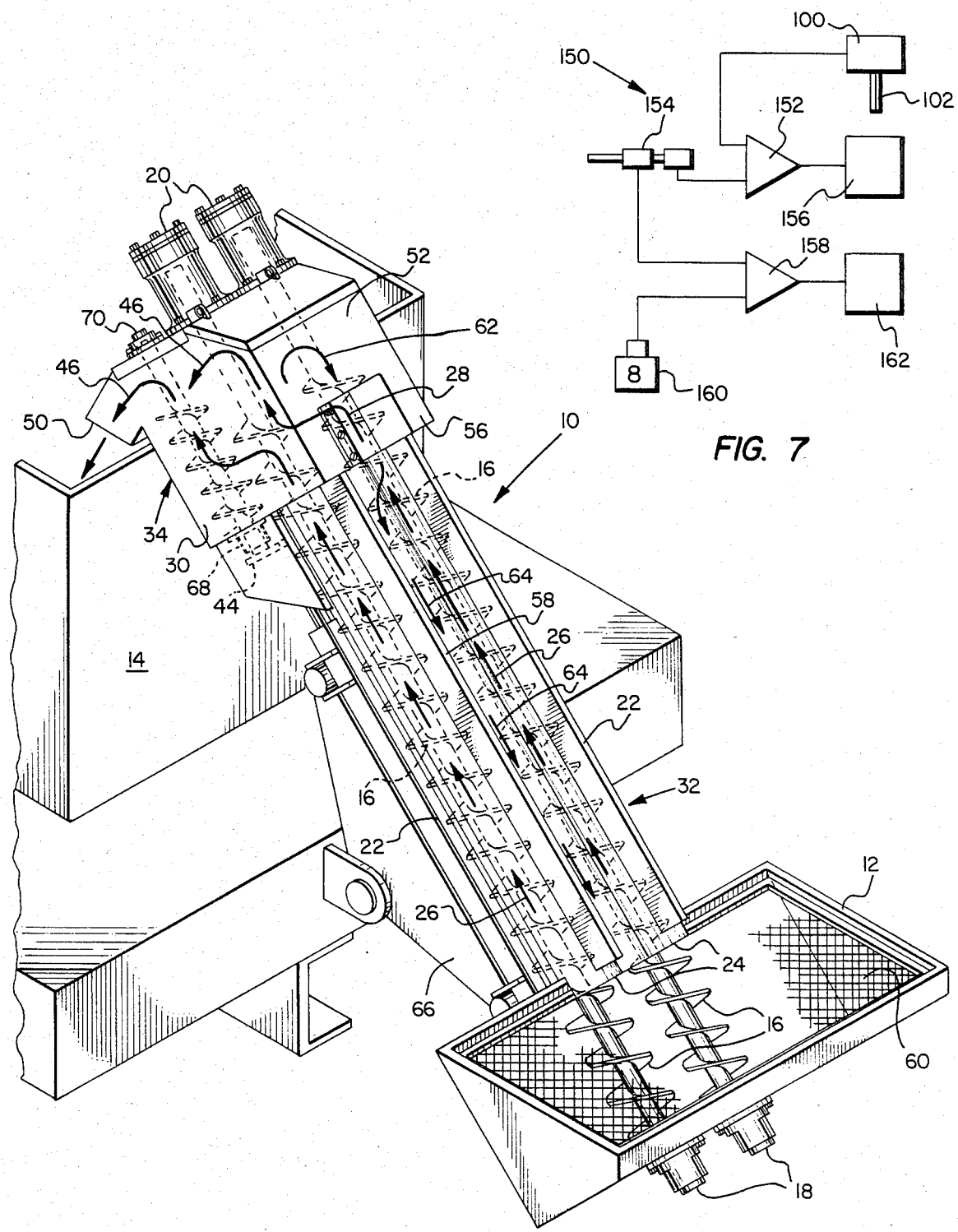
FIG. 1 is a perspective view of the present invention.
FIG. 7 is a block diagram of the flow measuring device.

The delivery and metering device for granulated or powdered material is generally designated 10 in FIG. 1. In the illustrated application, delivery and metering device 10 draws sand from collection facility or bin 12 to deliver a metered amount at processing equipment 14. The opening to bin 12 is covered by screen 60. Main screws 16 are mounted on an incline between bearings 18 at the base of bin 12 and motors 20 which rotate the main screws from the head of main screw feeder 32.

Main screws 16 engage sand within bin 12 and advances the sand through inlets 24 into main screw housing 22. Main screws 16 are illustrated in dotted outline through main screw housing 22 in FIG. 1. Arrows 26 designate the movement of sand up the inclined main screw housing. Arrows 28 are illustrated in a view through main screw housing 22 and through metering screw housing 30 to designate the transfer of sand from the main screw feeder 32 to the means for metering the flow of granulated or powdered materials 34. This transfer is accomplished across a passage best illustrated in FIG. 2 at the concurrence of advance outlet 36 from main screw housing 22 and delivery inlet 38 of metering screw housing 30.

In the preferred embodiment illustrated in FIG. 6, metering means 34 includes first and second metering screws 40 of identical pitch and orientation arranged in parallel intermeshing relationship within metering screw housing 30. Each metering screw 40 is a right-hand screw of identical pitch and orientation and these are driven in synchronous revolution by a motor 42 on one of the metering screws and by a chain drive 44 connecting the other metering screw on a one-to-one ratio relationship.

Returning to FIG. 1, arrows 46 represent the discharge of sand from metering screw housing 30 through delivery outlet 50 and to processing equipment 14.

Returning to main screw housing 22, another opening, the recycle outlet 52 passes sand which was not received into the metering screw housing below. Recycle outlet 52 is best illustrated in FIG. 2. Arrow 62 of FIG. 1 designates the motion of the sand which has passed advanced outlet 36 and is expelled through recycle outlet 52. Recycle outlet 52 is covered by a hood 56 which directs the expelled sand to open through 58 formed on the top exterior of main screw housing 22 between main screws 16. Measuring device 100 is interposed in the flow of the recirculating sand. Trough 58 returns the sand to bin 12 which receives the sand after it sifts through screen 60. The motion of sand down the trough has been designated by arrows 64 in FIG. 1.

FIG. 2 is a side view of delivery and metering device 10 in which some otherwise hidden features are illustrated in dotted outline as seen through bin 12 and main screw housing 22. Other regions of main screw housing 22, metering screw housing 30 and hood 56 have been broken away to best illustrate interior features.

Only one of two main screws 16 of main screw feeder is shown in the side view of FIG. 2. Main screw feeder 32 is disposed on an incline on base 66 and leads from the base of bin 12 at which main screws 16 are rotatably connected with bearings 18. Main screw housing 22 reaches into bin 12 to begin at inlet 24. The path of sand drawn from bin 12 into main screw housing 22, is again designated with arrows 26. The elevated end of main screw housing 22 has been broken away to clearly illustrate advance outlet 36 and recycle outlet 52 at a higher elevation in the main screw housing 22.

Main screws 16 extend to the top end of main screw housing 22 where each is attached to a motor 20. As with main screw 16, only one of motors 20 is visible in FIG. 2.

The partially broken-away view of FIG. 2 reveals the interior of metering screw housing 30 to illustrate delivery inlet 50 to the metering screw housing concurrent with advance outlet 36 from the main screw housing. Again, the side view shows only one of the aligned metering screws 40. The paired metering screws are driven by motor 42 which is connected to the metering screw obscured in the view and which, in turn, is linked with chain drive 44 to the metering screw in the forefront of FIG. 2. The obscured metering screw 40 is disposed between motor 42 and bearings 68 and the driven metering screw is mounted between bearings 68 and 70. See also FIG. 6.

Arrows 28 and 46 designate the passage of sand drawn from advance outlet 36 into means for metering 34 through delivery inlet 38 and, driven by metering screws 40, out delivery outlet 50.

The matching of metering screws 40 illustrated in FIG. 6 produces a very efficient and accurate means for advancing granulated and powdered material such as sands in a metered manner. This arrangement of metering screws provides a sand output that is a more linear function of the metering screw speed than provided in conventional feeds. Conventional feeds counter-rotate matched screws of identical pitch but opposing orientation which matches a left-hand screw with a right-hand screw. This screw arrangement of conventional feeders results in unbalanced loading and is inefficient in that sand tends to travel around the screws rather than advance. By contrast, the present invention rotates in the same direction intermeshing twin screws of identical pitch and orientation. The effect of the present invention is to turn sand in one screw into its twin screw, turning sand into sand at the intersection of the screws and the blocking flow of sand reduces the revolution of sand about the screws. Thus the present invention is more efficient and better balanced. Similarly, efficiency is enhanced by matching the orientation of main feeder screws with respect to metering screws across the convergance of advance outlet 36 and delivery inlet 38. The relationship between the highest point in the delivery inlet to the metering screw housing 30 and the relative elevation of the lowest point of delivery outlet 50 produces a sensitive metering device that need perform only minimal driving functions. The relative friction of common dry chemicals and particularly granulated materials such as sand prevents the formation of a pressure head at advance outlet 36 caused by sand at higher elevation within the main screw housing from driving the sand up at the slight elevational difference between delivery outlet 38 and delivery outlet 50. However, this arrangement does provide for a very responsive system for metering screws disposed across this slight elevational differential. In this manner, a carefully measured flow of sand is drawn through means for metering 34 and expelled through delivery outlet 50 into processing equipment 14, here fracturing fluid mixing facilities.

To provide for the responsiveness in the means for metering 34, a slight excess of sand must always be present at advance outlet 36 of main screw housing 22. Thus, sand not accepted into the means for metering 34 at delivery inlet 38 is driven forward by main screws 16 to recycle outlet 52. Hood 56 provides a control turnaround for the sand expelled through outlet 52 as indicated by arrow 62. Hood 56 also serves as a mounting means for measuring device 100. Measuring device 100 has a rigid probe extension 108 which extends into the flow of excess sand as designated by arrows 64 on the recirculation path to bin 12. Housing 104 of measuring device 100 is mounted on the exterior of hood 56.

FIG. 3 is a cross-sectional view through housing 104 taken at line 3—3 of FIG. 2. Cross-sectioned at this point, the interior of measuring device 100 is illustrated from the top view.

Figure 4:
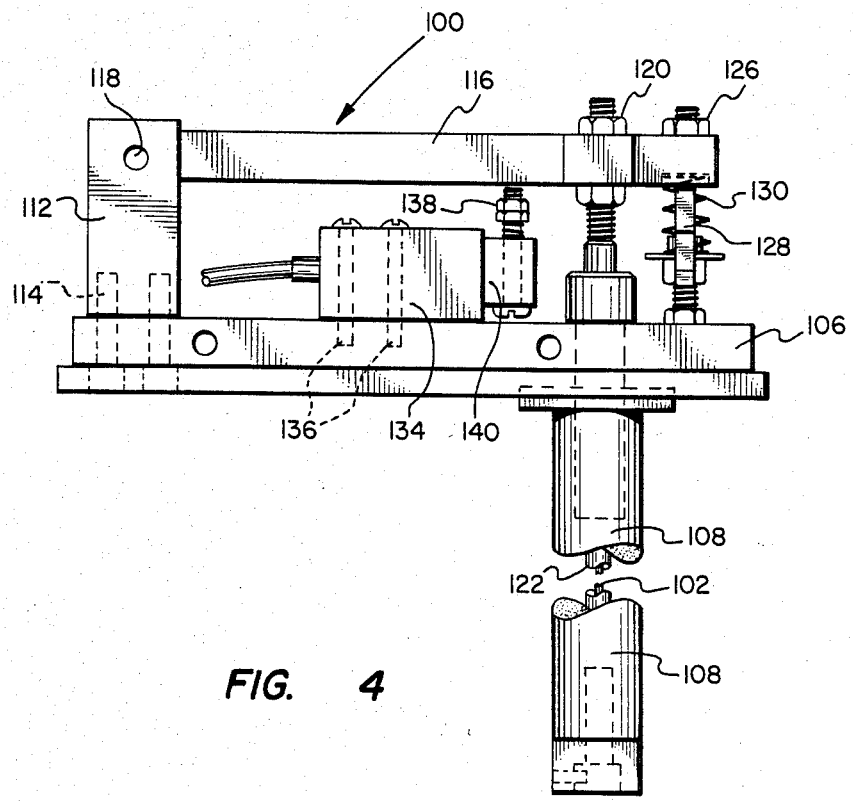
FIG. 4 is a side-plane view of the flow measuring device of the present invention.
Figure 5:
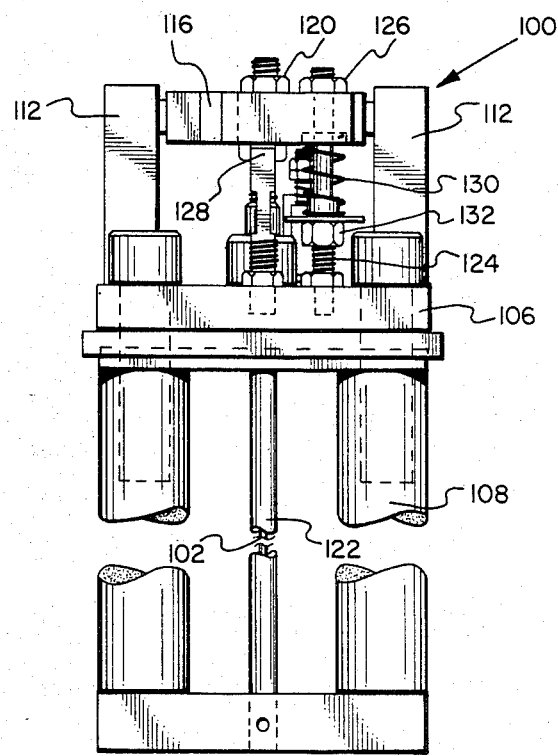
FIG. 5 is an end-plane view of the flow measuring device of the present invention.

Flow measuring device 100 is illustrated without housing 104 in FIGS. 4 and 5, FIG. 4 being a side view of flow measuring device 100 and FIG. 5 being an end view thereof. Each of FIGS. 3, 4 and 5 should be cross-referenced in reviewing measuring device 100. Flow measuring device 100 has a frame 106 from which rigid probe extension 108 extends downwardly into the path of the recirculating sand. Please refer to FIG. 2 which illustrates the position of rigid probe extension 108 in relation to the recirculation path of the sand. Bolts 110 which fasten rigid probe extension 108 to frame 106 are illustrated in FIG. 3. Pillow blocks 112 are formed as an extension of frame 106 and are bolted thereto as shown in FIG. 4 with bolts 114. Lever arm 116 is hingedly connected to pillow blocks 112 with hinge assembly 118.

Cable 102 is connected to lever arm 116 with bolt 120. Cable 102 is best illustrated in FIGS. 4 and 5 which also illustrate sheathing 122 which is a wear-resistant polyurethane tube or coating to protect cable 102 from abrasion by the sand.

Returning to FIG. 3, the end of calibration bolt 124 is seen after it passes through the lever arm 116. There safety nut 126 checks the upward distance that lever arm 116 may swing. Excess downward movement for lever arm 116 is limited by safety post 128 which is set in frame 106 and is illustrated by dotted outline in FIG. 3 because it is obscured in that view. Compare FIGS. 4 and 5.

FIG. 5 best illustrates counterbalance spring 130 about calibration bolt 124 which is connected to frame 106. A second nut, nut 132 upon calibration bolt 124, adjusts the tension in calibration spring 130 which pushes against lever arm 116.

Strain gauge housing 134 is attached to frame 106 beneath lever arm 116 as illustrated in FIG. 3 in dotted outline as this element would be there obscured and as best illustrated in FIG. 4.

Strain gauge housing 134 is attached to frame 106 with screws 136. Sensor arm 138 is connected to strain gauge 140 and reaches to contact lever arm 116.

Strain gauge 140 is of conventional features as well known in the art is connected to sensor arm 138 to detect minute deflections of lever arm 116 caused by variations of strain and deflection at cable 102. Cable 102 is prestressed against counterbalance spring 130 to take slack out of the cable and to maximize the sensitivity of the cable to the force exerted by rushing sand.

Conventional filtering and amplification means within strain gauge housing 134 produces an output signal which is then carried to means for controlling the speed of the main screws.

A schematic of control circuitry 150 of the preferred embodiment is illustrated in FIG. 7.

An increasing depth of sand flowing across cable 102 of measuring device 100 increases the voltage output of strain gauge 140. The strain gauge of measuring device 100 is connected to summing amplifier 152 as the first input thereto. The first output of dual potentiometer 154 is connected to summing amplifier 152 as the second input thereto. The first input of the dual potentiometer provides a selectively controlled input to that summing amplifier.

The output signal of summing amplifier 152 is connected to servo valve 156 which controls the speed of hydraulic motors 20 driving feeder screws 26 as a function of that signal. Please refer to FIG. 1 for an illustration of the latter.

Returning to FIG. 7, the second selectively controlled output of dual potentiometer 154 is connected as a first input to summing amplifier 158 and the output of flow meter 160 is connected to summing amplifier 158 as the second input thereto. In the preferred embodiment, flow meter 160 is a conventional turbine type flow meter positioned within the mixing facilities to measure the flow of water through a water inlet (not shown) to the mixing facilities or other processing stage. The output signal of summing amplifier 158 is connected to servo valve 162 which controls the speed of hydraulic motor 42 driving metering screws 40 as a function of that signal. Please refer to FIG. 2 for an illustration of the latter.

Although the invention has been illustrated with respect to a sand delivery and metering device for fracturing fluid applications, the delivery, metering and flow measuring device of the present invention is applicable to other systems requiring the movement and measurement of a flow of granulated or powdered materials. This application is not intended to be merely limited to the fracturing fluid useage and many additional applications will become apparent to those skilled in the art upon inspection of the device as described above. Further, although the invention has been described and illustrated with a certain degree of particularity, it is understood that the present disclosure has been made by way of example only and that numerous changes in the details of construction in combination and arrangement with the parts may be resorted to without departing from the spirit and scope of the invention as hereinafter claimed.

I claim:

1. A device for delivering and metering a flow of granulated or powdered material from a collection facility to a processing stage, said device comprising:
   a first metering screw;
   a second metering screw parallel to and intermeshed with said first metering screw, said first and second metering screws having identical pitch and orientation;
   means for driving said first and second metering screws in synchronous rotation;

means for controlling the speed at which the first and second metering screws are driven;

a metering screw housing surrounding both the first and second metering screw;

a metering inlet of said metering screw housing;

a delivery outlet of said metering screw housing having a lowest elevation at substantially the same elevation as the highest elevation of the inlet to said metering screw, said delivery outlet being disposed to pass the flow of the granulated or powdered material to the processing stage; and means for presenting a continuous flow of the granulated or powdered material from said collection facility to said metering inlet; and means for separating a portion of the flow of the granulated or powdered material not entering said metering inlet from the means for presenting a continuous flow.

2. A device for delivering and metering a flow of a granulated or powdered material in accordance with claim 1 wherein said means for presenting a continuous flow of the granulated or powdered material from said collection facility to said metering inlet is a main screw feeder.

3. A device for delivering and metering a flow of a granulated or powdered material in accordance with claim 2, wherein said device for delivering and metering a flow of a granulated or powdered material further comprises:

a recycle outlet to said main screw feeder;

a means for returning to the collection facilities the granulated or powdered material expelled at the recycle outlet;

a frame;

a rigid probe extension having a distended end which projects into said means for returning to the collection facilities the granulated or powdered material expelled at the recycle outlet;

a lever arm hingedly connected to the frame;

a cable having one end connected to the distended end of the rigid probe extension and having the other end connected to the lever arm;

a sensor arm disposed to engage said lever arm whereby variations of force exerted on said lever arm by said cable is transmitted to said sensor arm;

a strain gauge connected to said sensor arm to measure variations of strain and displacement in the sensing arm as an input and to generate an output signal that is a function thereof; and means for controlling the speed of the main screw feeder responsive to the output signal of the strain gauge.

4. An apparatus for delivering and metering a flow of a granulated or powdered material from a collection facility to a processing stage, said device comprising:

a metering screw means;

a metering screw housing surrounding said metering screw means;

a metering inlet in said metering screw housing;

a delivery outlet in said metering screw housing having the lowest elevation at substantially the same elevation as the highest elevation of the inlet to said metering screw housing, said delivery outlet being disposed to pass the flow of the granulated or powdered material to the processing stage;

means for presenting a continuous flow of the granulated or powdered material from said collection facility to said metering inlet such that said inlet is normally continuously filled with granulated or powdered material;

means for driving and controlling the speed at which said metering screw means is driven thereby controlling the flow of material to the processing stage; and means for separating a portion of the flow of the granulated or powdered material not entering said metering inlet from the means for presenting a continuous flow.

5. The device according to claim 4 wherein said metering screw means comprises:

a first and second metering screw positioned in parallel and intermeshed one with the other, said first and second metering screws having identical pitch and orientation.

6. The apparatus of claim 4 wherein said means for presenting a continuous flow of the granulated or powdered material from said collection facility to said metering inlet is a main screw feeder for delivering granulated or powdered material from the collection facility to the inlet in said metering screw housing.

7. A device for delivering and metering a flow of sand from a bin to a processing stage, said device comprising:

twin main screws;

means for driving said main screws;

an inclined main screw housing surrounding said main screws;

an inlet to said main screw housing adjacent said bin;

an advance outlet to said main screw housing at a position elevated from said inlet; and a recycle outlet to said main screw housing at a position elevated from said advance outlet;

means for metering the flow of sand from the bin to the processing stage comprising;

a first metering screw;

a second metering screw parallel to and intermeshed with said first metering screw, said first and second metering screws having identical pitch;

means for driving said first and second metering screws in synchronous rotation;

means for controlling the speed at which the first and second metering screws are driven;

a metering screw housing surrounding both the first and second metering screw;

a metering inlet of said metering screw housing in open communication with the advance outlet of said main screw housing; and a delivery outlet of said metering screw housing having a lowest elevation at substantially the same elevation as the highest elevation of the inlet to said metering screw, said delivery outlet being disposed to pass the flow of sand to the processing stage; and a trough running down the exterior of the main screw housing, beginning at the recycle outlet thereof and terminating at the bin;

a frame;

a rigid probe extension which projects into said means for returning to the collection facilities the sand expelled at the recycle outlet;

a lever arm hingedly connected to the frame;

a cable having one end connected to the distended end of the rigid probe extension and having the other end connected to the lever arm;

a sensor arm disposed to engage said lever arm whereby variations of force exerted on said lever arm by said cable is transmitted to said sensor arm;

a strain gauge connected to sensor arm to receive the movement thereof as an input and to generate an output signal that is a function thereof; and means for controlling the speed of the main screws responsive to the output signal of the strain gauge.

8. A device for delivering and metering a flow of sand from a bin to a processing stage constructed in accordance with claim 7 and further comprising:

a safety post mounted to said frame beneath said lever arm, in close proximity therewith;

a counterbalance spring mounted to said frame beneath said lever arm and pressing against said lever arm; and a safety nut fastened to said frame but disposed above said lever arm in close proximity therewith for limiting the upward freedom of the lever arm.

9. An apparatus for delivering and metering a flow of a granulated or powdered material from a collection facility to a processing stage, said device comprising:

a metering screw means;

a metering screw housing surrounding said metering screw means;

a metering inlet in said metering screw housing;

a delivery outlet in said metering screw housing having the lowest elevation at substantially the same elevation as the highest elevation of the inlet to said metering screw housing, said delivery outlet being disposed to pass the flow of the granulated or powdered material to the processing stage;

means for presenting a continuous flow of the granulated or powdered material from said collection facility to said metering inlet comprising a main screw feeder for delivering granulated or powdered material from the collection facility to the inlet in said metering screw housing;

means for driving and controlling the speed at which said metering screw means is driven thereby controlling the flow of material to the processing stage, a recycle outlet in said main screw feeder, the lowest point of said outlet being positioned substantially at or above the highest elevation of the inlet in said metering screw housing; and means for returning to the collection facility the granulated or powdered material expelled at the recycle outlet.

10. The apparatus of claim 9 further comprising:

means for sensing the flow of material from the recycle outlet in said main screw feeder, and means responsive to said sensing means for controlling the operation of said main screw feeder to limit the flow of material from the recycle outlet.

11. The apparatus of claim 9 further comprising:

a frame;

a rigid probe extension having a distended end which projects into said means for returning to the collection facilities the granulated or powdered material expelled at the recycle outlet;

a lever arm hingedly connected to the frame;

a cable having one end connected to the distended end of the rigid probe extension and having the other end connected to the lever arm;

a sensor arm disposed to engage said lever arm whereby variations of force exerted on said lever arm by said cable is transmitted to said sensor arm;

a strain gauge connected to said sensor arm to measure variations of strain and displacement in the sensing arm as an input and to generate an output signal that is a function thereof; and means for controlling the speed of the main screw feeder responsive to the output signal of the strain gauge.

12. A device for delivering and metering a flow of a granulated or powdered material from a collection facility to a processing stage comprising:

a main screw;

means for driving said main screw;

a main screw housing for receiving said main screw therein;

an inlet to said main screw housing positionable to receive said granulated or powdered material at said collection facility;

an advance outlet in said main screw housing at a position elevated from said inlet; and a recycle outlet in said main screw housing at a position elevated from said inlet and said advance outlet;

means for metering the flow of the granulated or powdered material from the collection facility to the processing stage comprising:

a metering screw means;

means for controlling the speed at which said metering screw means is driven;

a meter screw housing for receiving said metering screw means;

a metering inlet of said metering screw housing in open communication with the advance outlet of said main screw housing; and a delivery outlet of said metering screw housing having a lowest elevation at substantially the same elevation as the highest elevation of the inlet to said metering screw means, said delivery outlet being disposed to pass the flow of the granulated or powdered material to the processing stage; and means for returning to the collection facility the granulated or powdered material expelled at the recycle outlet of the main screw housing.

13. The device according to claim 12 wherein said metering screw means comprises:

a first and second metering screw positioned in parallel and intermeshed one with the other, said first and second metering screws having identical pitch and orientation.

14. The device according to claim 12 comprising:

means for sensing the flow of material from said recycle outlet in said main screw housing, and means responsive to said sensing means for controlling the operation of said main screw to control the flow of materials from said recycle outlet.

15. The device for delivering and metering a flow of a granulated or powdered material in accordance with claim 12 comprising:

a frame;

a rigid probe extension projecting from said frame into said means for returning to the collection facility the granulated or powdered material expelled at the recycle outlet;

a lever arm hingedly connected to the frame;

a cable having one end connected to the distended end of the rigid probe extension and having the other end connected to the lever arm;

a sensor arm disposed to engage said lever arm whereby variations of force exerted on said lever arm by said cable is transmitted to said sensor arm;

a strain gauge connected to said sensor arm to receive the movement thereof as an input and to generate an output signal that is a function thereof; and means for controlling the speed of the main screw responsive to the output signal of the strain gauge.

* * * * *